US008152608B1

(12) United States Patent
Hamby

(10) Patent No.: US 8,152,608 B1
(45) Date of Patent: Apr. 10, 2012

(54) SOLAR ENERGY INTERCEPT AND WASTE HEAT RECOVERY SYSTEM

(76) Inventor: Aubrey Eugene Hamby, Amarillo, TX (US)

(*) Notice: Subject to any disclaimer, the term of this patent is extended or adjusted under 35 U.S.C. 154(b) by 75 days.

(21) Appl. No.: 12/912,918

(22) Filed: Oct. 27, 2010

(51) Int. Cl.
*F24F 7/007* (2006.01)
*E04H 12/04* (2006.01)

(52) U.S. Cl. ........................................ 454/251; 52/653.1

(58) Field of Classification Search ................. 454/251, 454/252; 52/79.12, 312.1, 633, 648.1, 653.1
See application file for complete search history.

(56) References Cited

U.S. PATENT DOCUMENTS

| | | | | |
|---|---|---|---|---|
| 2,621,027 A * | 12/1952 | Tatsch | | 165/56 |
| 2,733,786 A * | 2/1956 | Drake | | 52/633 |
| 3,124,847 A * | 3/1964 | Charniga, Jr. | | 52/198 |
| 3,368,473 A | 2/1968 | Sohda | | |
| 4,285,176 A * | 8/1981 | Runkle | | 52/93.1 |
| 4,393,633 A * | 7/1983 | Charniga | | 52/302.3 |
| 4,677,903 A | 7/1987 | Mathews | | |
| 4,741,391 A * | 5/1988 | Schmitz | | 165/56 |
| 5,038,541 A * | 8/1991 | Gibbar, Jr. | | 52/295 |
| 5,487,247 A * | 1/1996 | Pigg | | 52/302.3 |
| 5,964,067 A * | 10/1999 | Lehner et al. | | 52/220.2 |
| 6,319,115 B1 | 11/2001 | Shingaki | | |
| 6,843,718 B2 * | 1/2005 | Schmitz | | 454/186 |
| 7,565,775 B2 * | 7/2009 | Cooper et al. | | 52/199 |
| 7,654,051 B2 * | 2/2010 | Pollack | | 52/302.1 |
| 7,788,868 B2 * | 9/2010 | Pollack | | 52/302.1 |
| 7,827,743 B2 * | 11/2010 | Campisi et al. | | 52/198 |
| 7,837,127 B2 * | 11/2010 | Kristinsson et al. | | 236/49.3 |
| 7,934,349 B1 * | 5/2011 | Romig | | 52/653.1 |
| 2004/0134156 A1 * | 7/2004 | Morris et al. | | 52/633 |
| 2009/0165411 A1 * | 7/2009 | Schiffmann et al. | | 52/309.1 |
| 2009/0193739 A1 * | 8/2009 | Jackson | | 52/302.3 |
| 2010/0192498 A1 * | 8/2010 | Gleckman | | 52/475.1 |
| 2010/0257799 A1 * | 10/2010 | Johnson et al. | | 52/302.1 |
| 2010/0281784 A1 * | 11/2010 | Leo | | 52/16 |
| 2011/0120049 A1 * | 5/2011 | Leo | | 52/782.1 |

* cited by examiner

*Primary Examiner* — Steven B McAllister
*Assistant Examiner* — Frances H Kamps
(74) *Attorney, Agent, or Firm* — Susanne M Moore

(57) ABSTRACT

An energy management method and system for incorporation when constructing a building such that solar energy and waste heat is intercepted and diverted, in turn causing a reduction in the demand on the artificial heating and cooling unit.

4 Claims, 7 Drawing Sheets

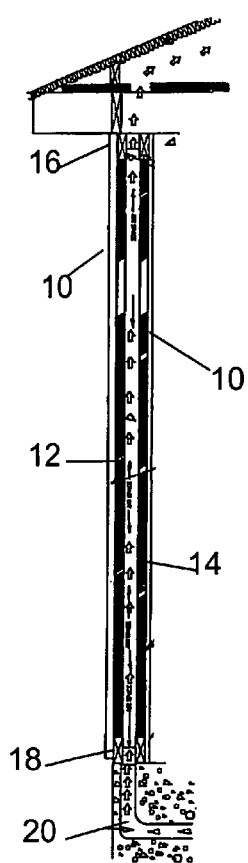
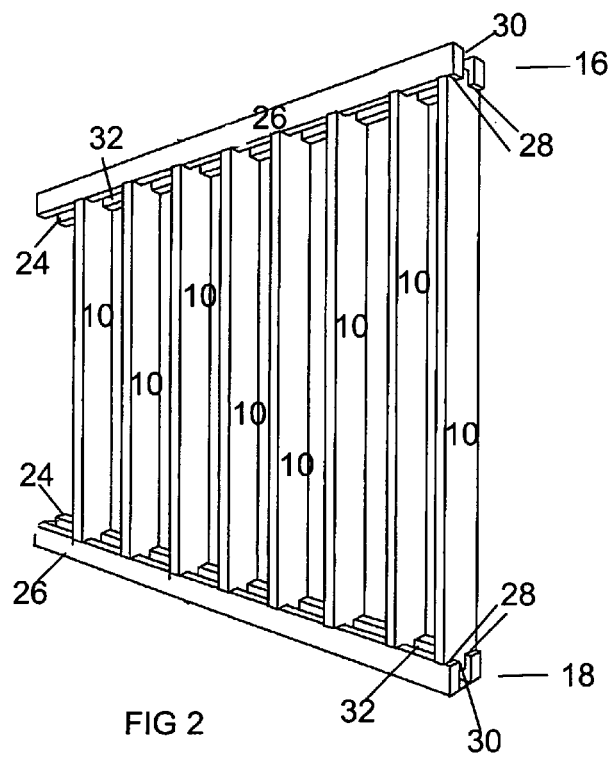
FIG 1
FIG 2

SOLAR ENERGY INTERCEPT AND WASTE HEAT RECOVERY SYSTEM

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of the Invention

The present invention relates generally to a building energy management method and system and, more specifically to a novel natural ventilation and waste heat recovery system.

2. Description of the Related Art

Solar heat continually builds up in walls and attic space during the summer season as a result of the sun's rays penetrating walls and roofing materials on buildings. Temperatures in attic spaces can rise to 130 degrees and higher as a result of solar heat. The sun's heat is continually penetrating the exposed exterior surface of every building. To date, builders and architects have attempted to combat the problem by using more insulation or insulation with a higher "R" (resistance) factor and/or larger and more expensive mechanical equipment. Home and building owners ultimately pay the price in terms of higher materials costs to build the home or building and in terms of higher utility bills. Yet, it is far more expensive and difficult to deal with cooling heated air after it enters the cooled interior space than to prevent the heat from ever entering the space at all.

Heat transfer is the movement of heat from one place to another. The laws of thermodynamics govern heat transfer and it is a scientifically accepted principle that heat travels to cold. In other words, as the sun beats down on roofs and walls, the heat radiates through the structure and is trapped in the attic spaces and within the building, which is typically a lower temperature than the outdoors.

The trapping of solar heat in attic spaces is a well known problem and one method of addressing it is by attic ventilation fans, which help the hot air to release to the outdoors. Although a somewhat effective solution, attic fans only partially release the trapped heat in the attic space and do not address the heat trapped in the wall spaces. Energy recovery ventilation systems transfer heat from outgoing air to incoming air in the winter, and from incoming air to outgoing air in the summer, leading to lower heating and cooling requirements. There are several different types of energy recovery ventilation systems, but they all have in common a heat exchanger, controls, and one or more fans to move air through the machine. Although effective with regard to providing significant energy savings in heating and cooling, energy recovery ventilation systems are somewhat expensive to install, require maintenance and require electricity to run. These systems provide the most return on investment in climates with relatively extreme season or where costs of heating and cooling are unusually high.

Historically, buildings inherently had an abundance of natural ventilation by means of naturally occurring gaps and air spaces. As construction processes have improved, structures are much more air-tight than they once were, and as a result now rely on artificial heating and cooling, resulting in high energy costs. Natural ventilation systems rely on pressure differences to move fresh air through buildings. Pressure differences are caused by wind, the buoyancy effect created by temperature differences or differences in humidity. Regardless of the triggering factor, the amount of ventilation depends on the size and placement of openings in the structure.

A natural ventilation system really is a circuit, with equal consideration given to supply and exhaust. Openings such as transom windows, louvers, grills, or open floor plans are traditional ways one can complete the airflow circuit through a building.

One must also take into account code requirements regarding smoke and fire transfer when designing a natural ventilation system. For example, older buildings once used the stairway as the exhaust stack, which is no longer allowed due to code requirements.

Due to the above described difficulties, it is a challenge to design a ventilation system that is conducive to artificial heating and cooling yet simultaneously reduces energy costs by maximizing natural ventilation.

U.S. Pat. No. 3,368,473 describes construction panels and prefabricated structural members designed to create a ventilation section and an insulation section, the ventilation section to remove and prohibit the communication of solar heat to the interior of the building. The patent describes use of insulating material bounded by sheets on either side, the sheets formed in overlapping sections.

U.S. Pat. No. 4,677,903 describes supplementary building construction to be added to the roof and/or external walls of an existing building structure to selectively create air flow over external surfaces of the building or to alternatively trap air as needed to assist with unwanted heat absorption. The invention describes the necessity of covering flaps for the open ends of the air space.

U.S. Pat. No. 6,319,115 describes air cycle houses and house ventilation systems and has insulating and ventilating layers. This invention draws outdoor air into the indoor space from an air intake and further utilizes a heat exchange ventilator.

Although the prior art patents described above discuss innovative methods for using natural ventilation or heat exchange ventilation to improve energy costs, none disclose an inner wall construction design and solar energy intercept and waste heat recovery system such as described herein, wherein unwanted heat is diverted outside during the summer, before it ever enters the cooled interior space, and is diverted inside during the winter for use to assist with heating the interior space.

SUMMARY OF THE DISCLOSED INVENTION

In accordance with the present disclosure, an improved method and system is described for a building design that is able to intercept and recovery solar energy and waste heat.

It is an object of the disclosed invention to intercept and release into the atmosphere heat trapped within wall space.

It is an object of the disclosed invention to intercept and release into the atmosphere heat trapped within attic space.

It is an object of the disclosed invention to recover and divert unwanted heat back into the atmosphere long before the air conditioning system is triggered to turn on, reducing the workload of the HVAC system and reducing energy costs in the summer.

It is an object of the disclosed invention to prevent unwanted heat in the inner wall space and attic from ever entering the interior of the building, thus reducing the burden on the A/C equipment.

It is an object of the disclosed invention to provide a building design that enables use of a smaller and less expensive HVAC system by recovering and diverting unwanted heat.

It is an object of the disclosed invention to provide a building design that recovers and diverts solar heat into the building interior during the winter to reduce the workload of the HVAC system and reduce energy costs in the winter.

It is an object of the disclosed invention to control and utilize heat buildup in the inner wall cavity and attic space.

It is an object of the disclosed invention to lower energy costs to heat and cool a building.

Other objects and advantages of the present invention will become apparent from the following descriptions, wherein, by way of example, an embodiment of the present invention is disclosed.

BRIEF DESCRIPTION OF THE DRAWINGS

The figures or drawings contained herein represent preferred embodiments of the invention and are not intended to limit the scope. For a detailed description of various embodiments, reference will now be made to the accompanying illustrative drawings in which:

FIG. 1 depicts a close up cutaway end view of the interior of an exterior wall space.

FIG. 2 depicts side perspective view of the interior of an exterior wall space.

DETAILED DISCLOSURE

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Specifically the present disclosure is a comprehensive solution to diverting unwanted heat buildup from a building in the summer, while recovering and utilizing trapped heat in a building during the winter.

The disclosed method and system creates a specific center cavity in the interior wall space where air can circulate freely. This is achieved by rearranging the manner in which the wall is constructed. An interior wall cavity caputures and diverts unwanted heat back into the atmosphere during the summer season, thereby addressing the heat issue before expensive A/C cooling equipment becomes involved. Cavity sensors located in the interior wall space monitor the heat buildup and are integrated into the system in order to automate the response.

During the winter season, a built in damper system is used to direct heat buildup back into the wall cavities and under the building, or into the building HVAC return air system to be used to reduce the winter season utility cost by adding otherwise wasted heat to the heat produced by the building return air system. This recovery of otherwise wasted heat enables the building owner to install smaller and less expensive HVAC equipment. Ultimately this should result in reduction in building costs in addition to reduction in energy costs.

Figures 3A, 3B:
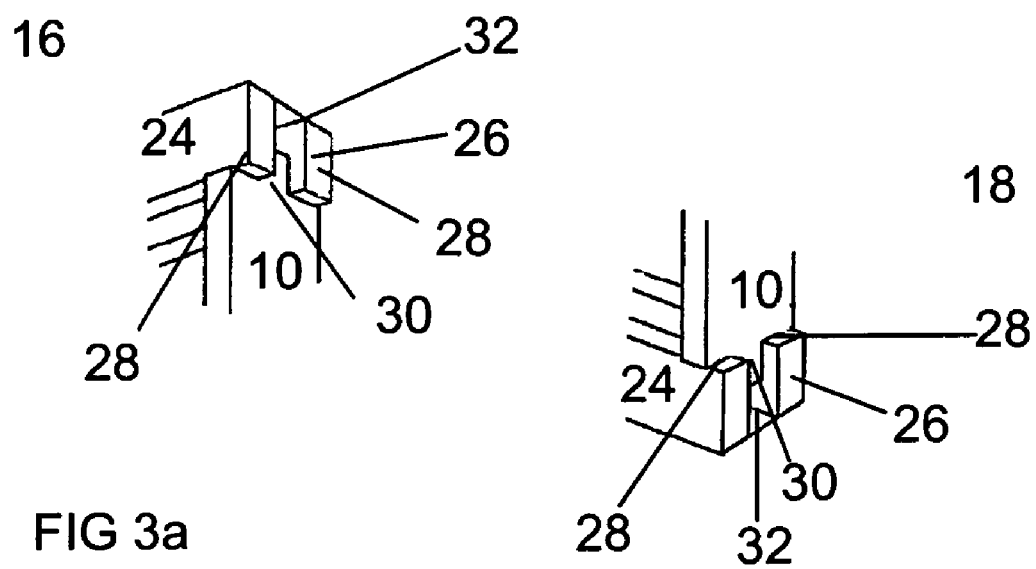
FIG. 3a depicts a closeup of a top plate of an exterior wall.
FIG. 3b depicts a closeup of a bottom plate of an exterior wall.

Turning to the figures to further illustrate the disclosed method and system, FIG. 1 reveals an end cutaway view of the interior of an exterior building wall. Traditional construction of a building wall is typically vertical 2×4 studs at 16" on center. In between each stud is thick insulation to achieve the disclosed method and system, the disclosed wall is instead comprised of vertical 2×6 wall studs 10 at 24" on center. The 24" center is spanned by an outer layer 1½" foam wall insulation panel 12 and an inner layer 1½" foam wall insulation panel 14. A center cavity of approximately 3" is formed by the space between the insulation panels. The use of 2×6" instead of 2×4s enables this cavity. In traditional construction, a horizontal 2×4 is laid across the top of all the wall studs to create a top plate. The disclosed invention instead provides that spanning the top of the wall studs and also the bottom of the wall studs is a horizontal interior 2×6 stud and a horizontal exterior 2×6 stud, both of which are turned on their side and are spaced 2½" apart as illustrated in FIG. 3a. These create a top plate 16 and a bottom plate 18.

Pictured at the bottom of the wall in FIG. 1 is a plastic 2" pipe 20 serving as part of the exhaust makeup air system under the slab (this foundation makeup air system may also be used in crawl space for pier and beam construction). The vertical arrows pictured on FIG. 1 reflect the direction of the airflow as it comes up from the foundation area, proceeds up through the interior of the wall and escapes out to the attic.

FIG. 2 is a side perspective view of the interior construction of the building exterior walls. Pictured are the 2×6 wall studs 10 spaced at 24" apart. More easily visualized in FIG. 2 are the cutouts of the top plate 16 and the bottom plate 18 which are further comprised of an interior horizontal 2×6 stud 24 turned on its side placed next to an exterior second horizontal 2×6 stud 26 turned on its side with cutouts 28 in each corner of the wall studs 10 such that the wall studs 10 rest on the sides of the interior studs 24 and the exterior studs 26 of the top plate 16 and bottom plate 18. The uncut center 30 of the wall studs 10 notches into the space 32 created between the interior horizontal studs 24 and the exterior horizontal studs 26 creating the top plate 16 and bottom plate 18. The space 32 allows air channels to travel under the bottom of the wall studs 10 and above the top of the wall studs 10.

FIG. 3a is a close up view of the top plate 16 showing the corner cutouts 28 of the wall stud 10, on which the top plate interior stud 24 and top plate exterior stud 26 rests, and further illustrating the top space 32 allowing the air channel that is created by the center uncut 30 portion of the wall stud 10 protruding only approximately halfway into the space created between the two horizontally side-lying studs forming the top plate 16.

FIG. 3b is a close up view of the bottom plate 18 showing the corner cutouts 28 of the wall stud 10, on which the bottom plate 18 interior stud 24 and exterior stud 26 rest, and further illustrating the bottom space 32 air channel that is created by the center uncut 30 portion of the wall stud 10 protruding only approximately halfway into the space created between the two horizontally sidelying studs forming the bottom plate.

Figure 4:
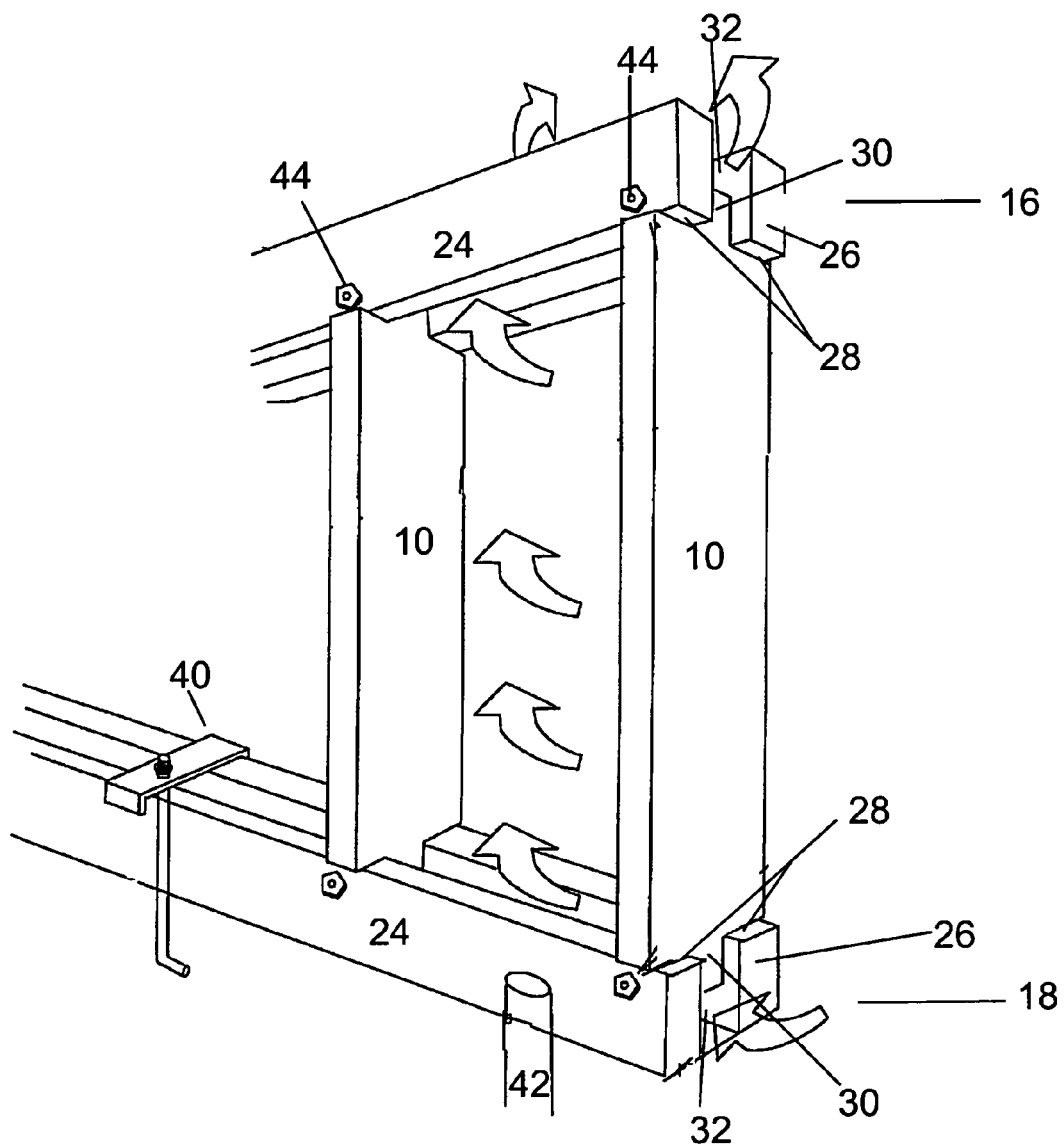
FIG. 4 depicts a closeup view of the interior of the wall space with the air flow demonstrated.

FIG. 4 is a closeup of the details of the FIG. 2 wall. The figure again illustrates the top plate 16 constructed of two horizontally adjacent 2×6 studs turned on their sides, one being interior 24 to the wall and one being exterior 26. The figure further illustrates that each corner of the wall studs 10 are cutout 28 (approximately a 1½" by 3" cutout) such that the sides of the top plate 16 studs rest on the cutouts 28 and the center uncut 30 portion of the wall stud 10 protrudes approximately halfway into the space 32 created by the two sidelying horizontal top plate studs. The figure illustrates the bottom plate 18 which has the same configuration as the top plate 16 described above.

Illustrated on the bottom plate 18 are boltdowns 40 for securing the wall to the foundation. This may comprise ½" metal plate spanning the width of the bottom plate and bolted down into the foundation using a ⅝"×16" J-bolt although other means of bolting the wall to the foundation may be used as per local building code requirements. The bolts may be placed 4" apart although other spacing may be appropriate depending upon local building requirements. Also illustrated towards the end of the bottom plate is the intake end of a 2" exhaust plastic pipe 42 which comprises part of the under slab makeup air system, the intake end pulling in ambient air from outside to replace the evacuated hot air in the summer months. At the top of the wall and at the bottom of the wall are visualized screws 44 or bolts attaching the sidelying horizontal top plate 16 and bottom plate 18 studs to the center uncut portion 30 of the wall studs 10. Placed in between the 2×6 wall studs is 1½" thick×22½" wide foam insulation, leaving a 3"×1½" middle cavity interiorly in the wall around the entire perimeter of the structure, serving to channel air and create circulation. The waste heat air flows from the wall cavity into the attic space through the top plate channel where it is then removed by the exhaust system to the atmosphere. Cool make-up air is drawn from the crawl space, or thru the plastic pipe make-up air system installed under the concrete floor slab, to replace the solar heated air which is continually being exhausted out into the atmosphere.

The only fan HP required to remove 300/400 CFM of heated air on a continuing basis will be calculated for each application by the installer of the fan and damper system and will be based on the length of the perimeter wall of the structure.

Figure 5:
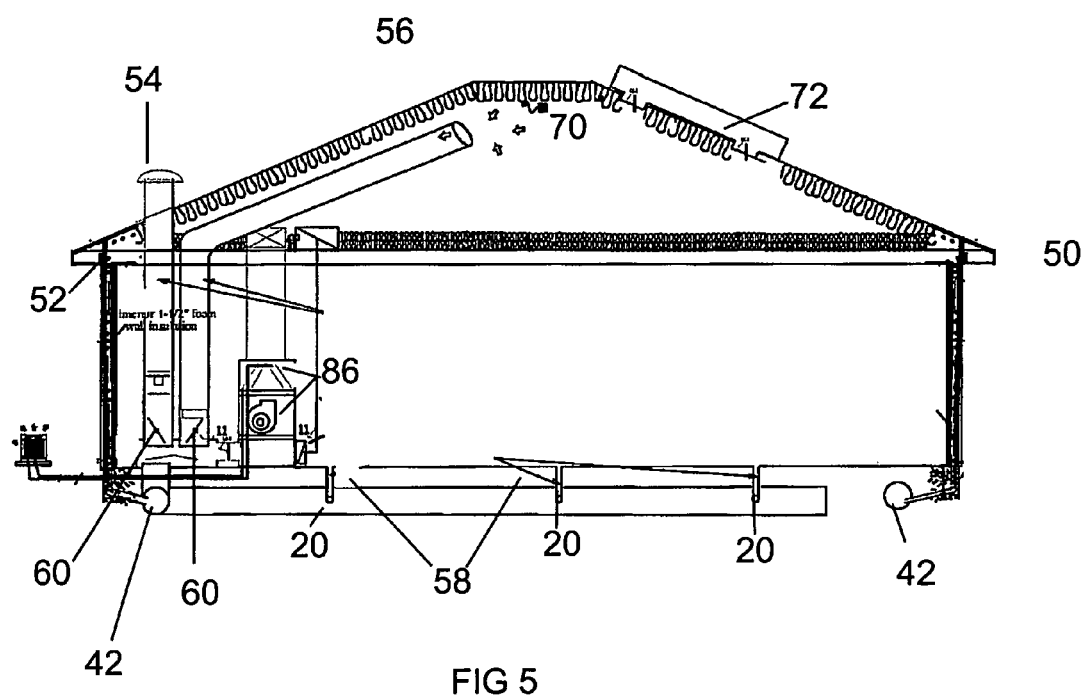
FIG. 5 depicts a cut away view of a building structure showing an exhaust fan and duct system with an under slab make up air supply.

FIG. 5 illustrates the disclosed method and system demonstrated in a concrete slab building 50. Also pictured are the wall vent 52 where the air channels from the interior wall into the attic, as well as the wall cavity system exhaust fan 54 and duct system 56 in conjunction with an under slab (could also be implemented under a crawl space) make-up ambient air system 58. There are dampers 60 which are kept closed in the wintertime and opened in the summer to vent the hot air out.

Figure 6:
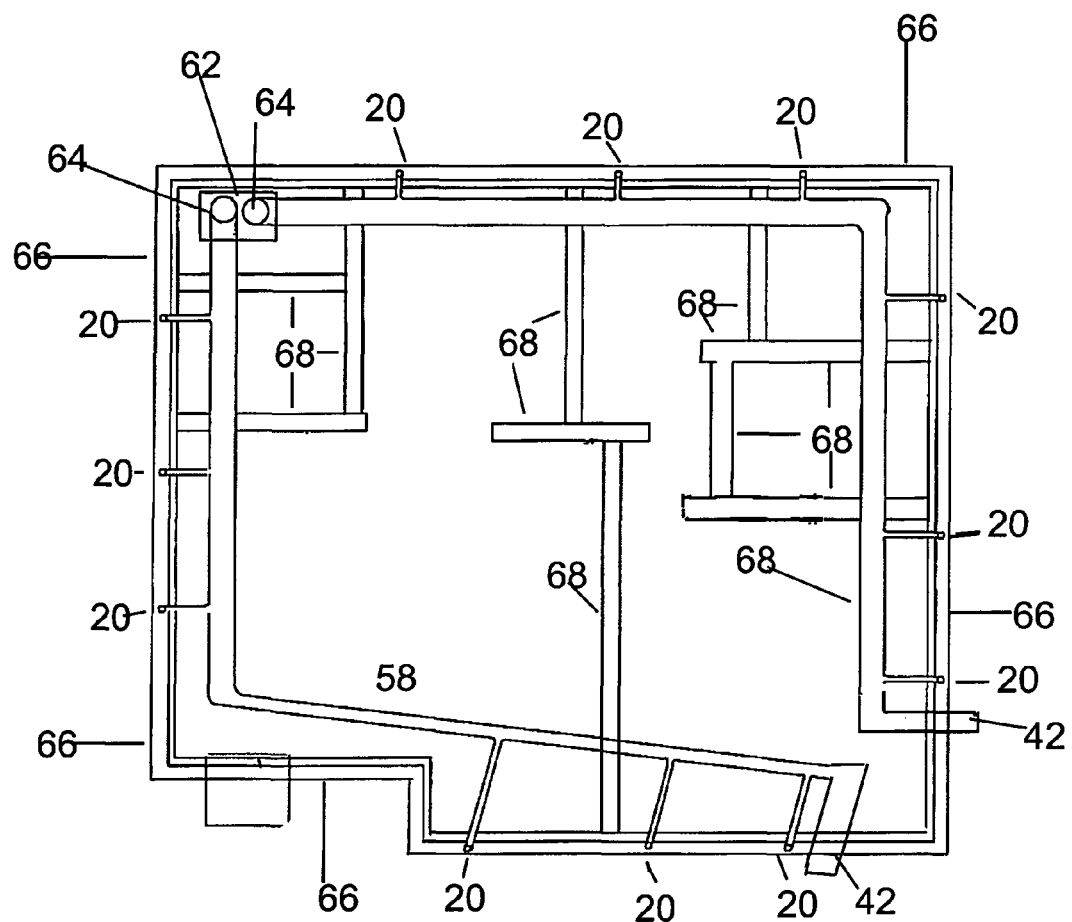
FIG. 6 is a top perspective cutaway showing an under floor slab makeup air system.

In FIG. 6 is showing the under slab makeup air system 58, which, in the preferred embodiment is constructed from 2" plastic pipe although could be constructed of other materials if achieving the same purpose. A gathering box 62 is pictured to which make up air flow is collected. Ambient air from the outside is brought in via the two separate intake pipes 64 pictured. The air flows into the exterior walls 66 where the cavities of the wall are, replacing the hot air that is flowing up through the cavity of the wall and into the attic for release. Interior walls 68 are pictured for reference purposes only.

Figures 7, 8:
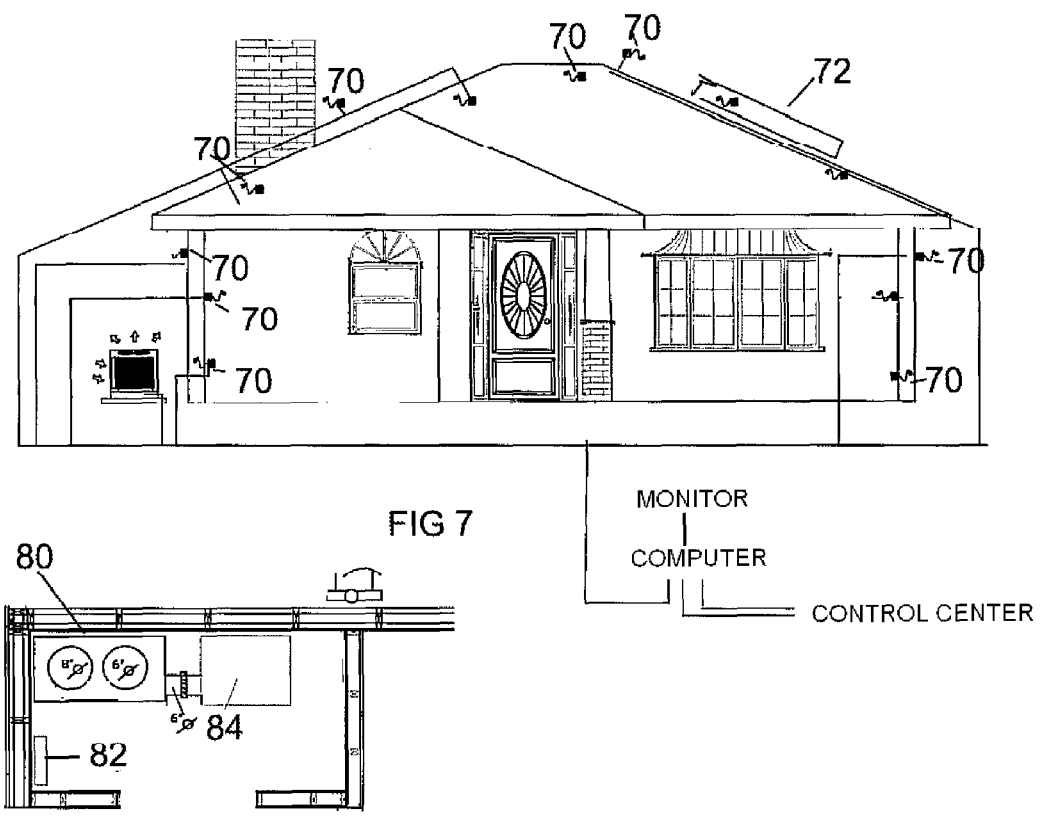
FIG. 7 is a front view of a building showing a computerized sensor system.
FIG. 8 is a top perspective view of the control room.

FIG. 7 more clearly illustrates the heat temperature cavity sensors 70 placed intermittently around the perimeter of the building to monitor the heat build-up and to control the fan when the heat in the cavity has reached a level to justify the utility cost to start and run the fan and damper system to remove the waste heat buildup. If placed correctly, only five to six sensors may be needed to adequately monitor the system. They should not be placed within exterior walls that stay predominantly shaded. The appropriate locations for the sensors will depend on the building and should be determined by the installer or contractor. The temperature in the cavity wall space rises gradually as the sun's energy penetrates the outer 1½" foam insulation panel. This penetration of solar radiated heat begins as soon as the sun touches the surface of the building in the early morning and continues until the sun sets in the evening. Insulation, no matter the "R" factor, can only resist the flow of heat from outside to the cooler environment inside. The invention disclosed herein utilizes the cavity sensors 70 to monitor the heat buildup until it reaches a preset high at which time the fan turns on to remove the heat to the atmosphere on a regular basis. Pictured on the roof of the building in FIG. 7 and FIG. 5 is a solar collecting box 72.

FIG. 8 reveals a top cutaway view of a control room showing the base of the exhaust system duct work 80 and a computerized solar intercept control center 82 to enable the sensor based system disclosed herein. Also pictured is the HVAC unit 84 for winter time use.

Figure 9:
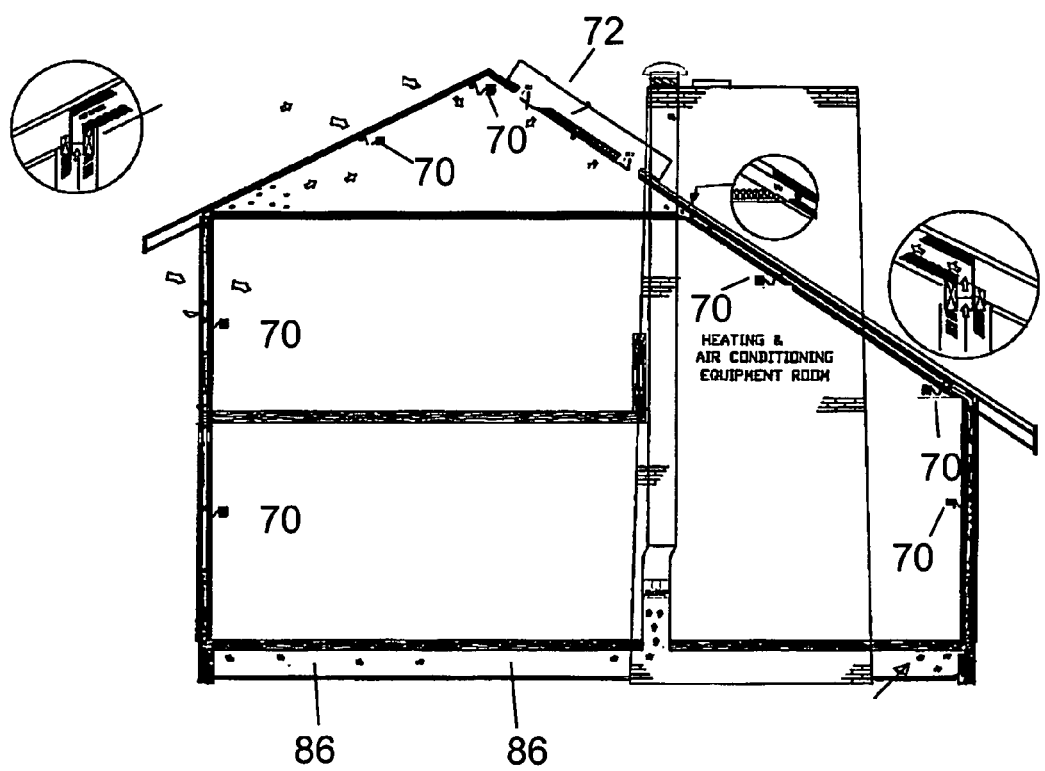
FIG. 9 is a side cutaway view of the interior of the building.

FIG. 9 reveals the disclosed invention in use on a two story building having a crawl space 86 and reveals by way of the arrows the flow of the circulating air.

In operation, the method and system works as follows. Without the disclosed invention, the sun beats onto the roof and exterior wall surface of the building, creating trapped hot air in the attic and within the wall space. Over time, this hot air transfers into the cooler interior of the building, causing the building's HVAC system to turn on to cool the air to the desired ambient temperature. When the building is constructed with the disclosed method and system the end result is much different. The heat is no longer trapped in the wall and attic space. Rather the air in the center cavity of the wall travels to the top wall air channel and proceeds into the attic space where it is vented by the attic exhaust fan into the atmosphere. As the heated wall air travels up to the attic, cool makeup air is replacing it by flowing into the wall space, coming from the crawl space, or, in the case of a slab foundation, traveling through the plastic pipe makeup air system and into the interior of the wall. The cavity heat sensors monitor the heat buildup in the walls. Once the interior wall heat reaches a preset high, the exhaust fan is triggered to turn on and circulate the wall air from the attic into the atmosphere.

Conversely, in the winter time, a damper system that communicates with the HVAC return air system or the interior of the building directly, diverts and recovers the wall and attic heat for use to help heat the interior of the building. The air travels through the same channels previously discussed. Solar intercept collecting boxes located on the roof also collect heat which translates into heated air in the attic that is then diverted back into the exterior wall cavity space and under the house, warming the house as it rises.

The disclosed methods and systems, if incorporated at the time of construction of the building, reduce the energy requirements of the building for the life of the structure.

While the disclosed methods and compositions have been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It is to be understood that the embodiments disclosed herein are shown for illustrative purposes and are not intended to be construed as limitations of the disclosed method and system. Those skilled in the art will recognize or be able to ascertain in the course of routine experimentation, that variations and equivalents of the embodiments may be undertaken without departing from the scope of the invention.

Certain terms are used throughout the description to refer to particular method components. As one skilled in the art will appreciate, design and manufacturing companies may refer to a component by different names. This document does not intend to distinguish between components that differ in name but not function.

The terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

The use of the word "a" or "an" when used in conjunction with the word "comprising" may mean "one", or may also mean "one or more." The use of the term "or" in the claims is used to mean "and/or" unless explicitly indicated to refer to alternatives only or the alternatives are mutually exclusive, although the disclosures supports a definition that refers to only alternatives and "and/or."

The methods and systems disclosed and claimed herein can be made and executed without undue experimentation based on the level of disclosure presented. While the methods and systems have been described in terms of their preferred embodiments, it will be apparent to those skilled in the art that they are not limited to the exact steps described and may vary from such description without departing from the scope and spirit of the invention. The substitutes and modifications employed by one skilled in the art are deemed to fall within the scope of the invention.

What is claimed is:

1. A building energy management system for diverting wall space air outside during the summer and inside during the winter, the system comprising:
    exterior walls of a building constructed of 2×6 studs and two layers of insulation, the insulation layers placed such that there is a vertical center cavity between the insulation layers, and the 2×6 studs being further connected their top ends by a horizontal top plate and at their bottom ends by a horizontal bottom plate, each plate comprising two studs turned on their sides such that a horizontal space exists between the two studs, which horizontal space is in fluid communication with the center cavity to create air channels; and
    an underslab makeup air supply for replacing diverted air, the air supply comprising a network of air duct piping in communication with the air channels in the walls and having at least one outdoor ambient air intake;
    a computerized control center;
    cavity heat sensors in the center cavity, the sensors in communication with the control center;
    one or more dampers in communication with an HVAC equipment return air duct for diverting the wall and attic air inside during the winter; and
    one or more attic exhaust fans for diverting air from the attic to the outside.

2. The system described in claim 1 wherein one or more solar collecting boxes are roof mounted.

3. A method for diverting wall space air outside during the summer and inside during the winter, the method comprising:
    constructing exterior walls of a building using 2×6 studs and two layers of insulation, the insulation layers placed such that there is a vertical center cavity between the insulation layers, and the 2×6 studs being further connected at their top ends by a horizontal top plate and at their bottom ends by a horizontal bottom plate, each plate comprising two studs turned on their sides such that a horizontal space exists, between the two studs, which horizontal space is in fluid communication with the center cavity to create air channels; and
    constructing an underslab makeup air supply for replacing diverted air, the air supply comprising a network of air duct piping in communication with the air channels in the walls and having at least one outdoor ambient air intake;
    activating a computerized control center;
    placing cavity heat sensors in the center cavity, the sensors in communication with the control center;
    placing one or more dampers in communication with an HVAC equipment return air duct for diverting the wall and attic air inside during the winter, and
    placing one or more attic exhaust fans for diverting air from the attic to the outdoor ambient air.

4. The method described in claim 3 wherein one or more solar collecting boxes are located on the building roof.

* * * * *